Feb. 21, 1933. S. OSTROFF 1,898,260
RUMBLE SEAT TOP
Filed Sept. 15, 1932
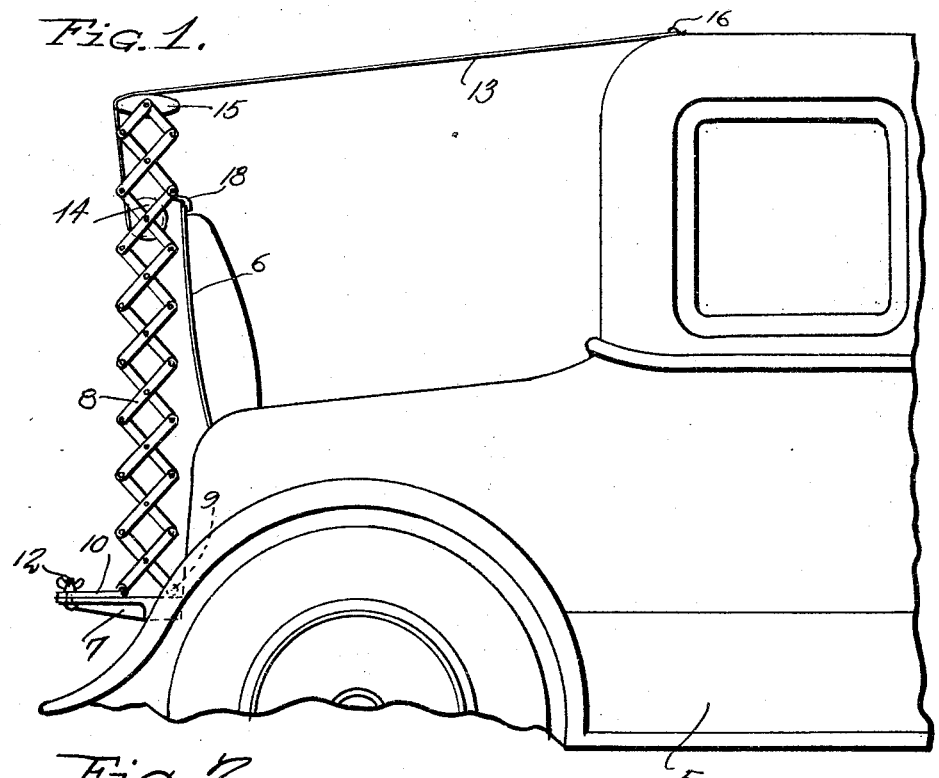
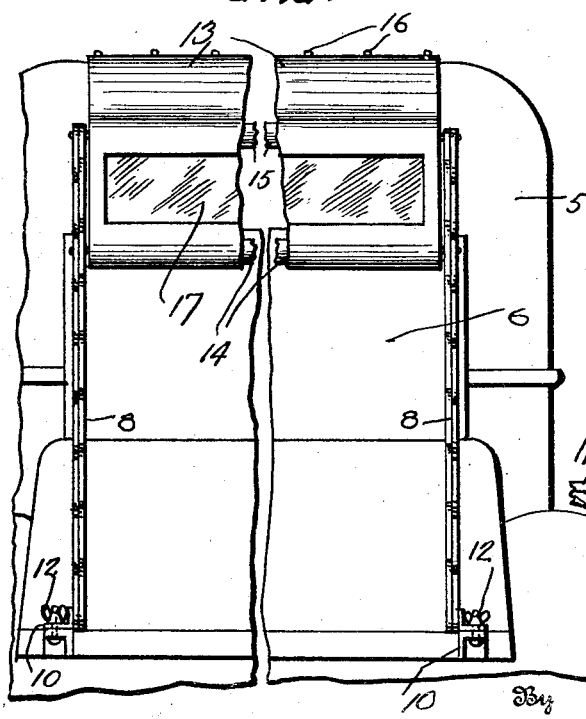
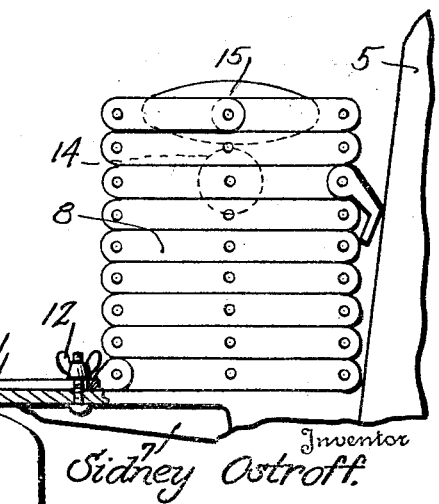
Inventor
Sidney Ostroff.
Bryant
Attorney.

Patented Feb. 21, 1933

1,898,260

UNITED STATES PATENT OFFICE

SIDNEY OSTROFF, OF LOWELL, MASSACHUSETTS

RUMBLE SEAT TOP

Application filed September 15, 1932. Serial No. 633,348.

This invention relates to certain new and useful improvements in rumble seat tops.

The primary object of the invention is to provide a top for the rumble seat of automobiles wherein the top in the form of a sheet carried upon spring roller is mounted on an adjustable frame of the lazy tong type that is collapsed in its inoperative position to occupy a minimum of space and to cooperate with the upper edge of the rumble seat back when the same is in opened position to be retained in an extended operative position whereby the top greatly extends over the open rumble seat.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a fragmentary side elevational view of an automobile provided with a rumble seat and illustrating the lazy tong support for the rumble seat top in its extended operative position at the rear end of the automobile;

Figure 2 is a fragmentary rear elevational view showing a window opening formed in a part of the rumble seat top to be positioned for rear vision when the top is in extended form; and Figure 3 is a fragmentary side elevational view, partly in section showing the lazy tong support for the rumble seat top in its collapsed position.

Referring more in detail to the accompanying drawing, the automobile 5 is of the coupé type provided with a rumble seat rearwardly of the closed body portion, the rumble seat including a hinged cover 6 illustrated in Figure 1 as being in its substantially perpendicular open position.

The canopy or top for the rumble seat is carried by an extensible frame that is mounted on rearwardly extending horizontally disposed bracket arms 7, the top support including a pair of lazy tongs 8, one supported on each bracket 7 at opposite sides of the automobile as shown in Figure 2, one lower link of each lazy tong construction having a permanent pivotal mounting 9 on its bracket arm 7 while the cooperating link of the lazy tong construction 8 is pivotally attached to a slide arm 10 movable over the bracket arm 7. As shown in Figure 3, the slide arm 10 is longitudinally slotted as at 11 and the nut and screw combination 12 carried by the bracket arm 7 and passing through the slot 11 of the slide plate 10 holds the slide plate in its adjusted position with the lazy tongs collapsed as shown in Figure 3 or extended into operative positions as shown in Figure 1.

The top for the rumble seat is in the form of a flexible sheet 13 having one end wound upon a tensioned roller 14 journalled between the lazy tong constructions at chosen points, the free edge of the top sheet 13 passing over a bolster guide 15 to be directed forwardly for detachable engagement as at 16 with the top of the closed body portion of the automobile 5. As shown in Figure 2, the top sheet 13 is provided with a window opening 17 permitting rear vision therethrough of the operator of the automobile. To retain the lazy tong constructions in their extended operative positions as illustrated in Figure 1, a hook member 18 is carried by each lazy tong construction to be engaged with the upper free edge of the rumble seat cover 6. The device is illustrated in its extended operative position in Figure 1 and in its collapsed inoperative position in Figure 3, the nut and screw combination 12 cooperating with the bracket arm 7 and slide plate 10 holding the lazy tong constructions in either of their positions.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

1. In a rumble seat top, brackets for attachment to an automobile, lazy-tong constructions mounted on the brackets, a roller journalled in the lazy-tong constructions, a rumble seat top carried by the roller and adapted to have its free outer end extended over the rumble seat and attached to the top of the automobile, and means carried by the lazy-tong constructions adapted to be engaged with the upper edge of the rumble seat cover when varied to brace the lazy-tong constructions when in extended operative positions.

2. In a rumble seat top, brackets for attachment to an automobile, lazy-tong constructions mounted on the brackets, a roller journalled in the lazy-tong constructions, a rumble seat top carried by the roller and adapted to have its free outer end extended over the rumble seat and attached to the top of the automobile, means carried by the lazy-tong constructions adapted to be engaged with the upper edge of the rumble seat cover when varied to brace the lazy-tong constructions when in extended operative positions, a lower link of each lazy-tong construction being pivoted on an associated bracket, a slide plate carried by the lower companion link and mounted on the bracket, and means for holding the slide plate in fixed positions on the bracket when the lazy-tong constructions are operatively or inoperatively positioned.

3. In a rumble seat top, brackets for attachment to an automobile, lazy-tong constructions mounted on the brackets, a roller journalled in the lazy-tong constructions, a rumble seat top carried by the roller and adapted to have its free outer end extended over the rumble seat and attached to the top of the automobile, means carried by the lazy-tong constructions adapted to be engaged with the upper edge of the rumble seat cover when varied to brace the lazy-tong constructions when in extended operative positions, a lower link of each lazy-tong construction being pivoted on an associated bracket, a slide plate carried by the lower companion link and mounted on the bracket, the slide plate being slotted and a bolt and nut combination carried by the bracket and extending through the slide plate slot for holding the slide plate in fixed positions on the bracket when the lazy-tong constructions are operatively or inoperatively positioned.

In testimony whereof I affix my signature.

SIDNEY OSTROFF.